(12) United States Patent
Soerensen

(10) Patent No.: US 9,022,166 B2
(45) Date of Patent: May 5, 2015

(54) HYDRAULIC STEERING ARRANGEMENT

(75) Inventor: Ole Vincentz Soerensen, Nordborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 2331 days.

(21) Appl. No.: 11/488,237

(22) Filed: Jul. 18, 2006

(65) Prior Publication Data

US 2007/0017731 A1  Jan. 25, 2007

(30) Foreign Application Priority Data

Jul. 19, 2005 (DE) .................... 10 2005 033 576

(51) Int. Cl.
*B62D 5/093* (2006.01)
*B62D 5/09* (2006.01)
*B62D 5/06* (2006.01)

(52) U.S. Cl.
CPC ............... *B62D 5/093* (2013.01); *B62D 5/062* (2013.01); *B62D 5/06* (2013.01); *B62D 5/09* (2013.01)

(58) Field of Classification Search
USPC .................... 180/417, 403, 441, 442
See application file for complete search history.

(56) References Cited

U.S. PATENT DOCUMENTS

| | | | | |
|---|---|---|---|---|
| 3,367,367 A * | 2/1968 | Moriyama et al. | ........ | 137/614.11 |
| 4,438,827 A * | 3/1984 | Lang | ............... | 180/423 |
| 4,548,442 A * | 10/1985 | Sugden et al. | .................. | 299/10 |
| 4,702,335 A * | 10/1987 | Cage et al. | .................... | 180/423 |
| 4,815,551 A * | 3/1989 | Lang | .............. | 180/422 |
| 4,866,936 A * | 9/1989 | Ohashi et al. | .................... | 60/422 |
| 4,953,361 A * | 9/1990 | Knoche et al. | .................... | 62/79 |
| 5,072,802 A * | 12/1991 | Tischer | ......................... | 180/417 |
| 5,487,403 A * | 1/1996 | Mollo | .......................... | 137/115.16 |
| 5,740,681 A * | 4/1998 | Karl | ............................ | 62/324.6 |
| 6,237,331 B1 | 5/2001 | Sorensen | ........................ | 60/384 |
| 6,240,711 B1 * | 6/2001 | Dillon | ............................ | 56/14.6 |
| 6,405,824 B1 | 6/2002 | Sorensen et al. | .............. | 180/442 |
| 6,581,717 B1 | 6/2003 | Sorensen et al. | .............. | 180/401 |
| 6,971,472 B2 * | 12/2005 | Pedersen et al. | ............. | 180/403 |
| 7,234,707 B2 * | 6/2007 | Green et al. | ................ | 280/5.511 |
| 2001/0020557 A1 | 9/2001 | Giversen et al. | ............. | 180/417 |
| 2001/0032751 A1 | 10/2001 | Giversen et al. | ............. | 80/441 |
| 2003/0196432 A1 * | 10/2003 | Pedersen et al. | ............. | 60/384 |
| 2003/0205279 A1 * | 11/2003 | Zenker et al. | ............ | 137/596.12 |
| 2004/0250536 A1 | 12/2004 | Soerensen | ........................ | 60/384 |
| 2005/0022522 A1 * | 2/2005 | Pedersen et al. | ................ | 60/325 |
| 2005/0139412 A1 * | 6/2005 | Vigholm | ....................... | 180/418 |
| 2005/0205337 A1 * | 9/2005 | Porskrog et al. | ............. | 180/417 |

FOREIGN PATENT DOCUMENTS

| | | |
|---|---|---|
| DE | 19825579 | 12/1999 |
| DE | 19851482 | 5/2000 |
| DE | 19931143 | 1/2001 |
| DE | 10011016 | 10/2001 |
| DE | 10011017 | 10/2001 |
| DE | 102004027971 | 1/2005 |

\* cited by examiner

*Primary Examiner* — Anne Marie Boehler
*Assistant Examiner* — Maurice Williams
(74) *Attorney, Agent, or Firm* — McCormick, Paulding & Huber LLP

(57) ABSTRACT

The invention concerns a hydraulic steering arrangement with a hydraulically actuated steering valve arrangement, steering motor connections (CL, CR), which are connected to supply connections (HP, T) via the steering valve arrangement, and a steering unit. It is endeavored to equalize in a simple manner the steering behavior in both directions. For this purpose, it is ensured that the steering valve arrangement has a directional valve and a flow control valve.

12 Claims, 2 Drawing Sheets

HYDRAULIC STEERING ARRANGEMENT

CROSS-REFERENCE TO RELATED APPLICATIONS

Applicant hereby claims foreign priority benefits under U.S.C. §119 from German Patent Application No. 10 2005 033 576.4 filed on Jul. 19, 2005, the contents of which are incorporated by reference herein.

FIELD OF THE INVENTION

The invention concerns a hydraulic steering arrangement with a hydraulically actuated steering valve arrangement, steering motor connections, which are connected to supply connections via the steering valve arrangement, and a steering unit.

BACKGROUND OF THE INVENTION

Such steering arrangements are, for example, known from DE 10 2004 027 971 A1. When a driver of a vehicle provided with such a steering arrangement wishes to steer the vehicle, he activates the steering unit. In dependence of the actuation of the steering unit, hydraulic pressures are generated, which activate the steering valve arrangement, thus releasing a flow path from the supply connections to the steering motor.

It has now been observed that in many cases there are differences in the steering behaviour of such steering arrangements, in dependence of whether steering is made to the left or to the right. Often, the driver finds this unpleasant.

This phenomenon could be remedied in that the production accuracy is increased and that all areas, channels, pressure admission surfaces etc., which are important for the determination of the flow of the hydraulic fluid, were made as equal as possible. However, the required production efforts would be substantial.

BRIEF SUMMARY OF THE INVENTION

The invention is based on the task of equalising the steering behaviour in a simple manner.

With a hydraulic steering arrangement as mentioned in the introduction, this task is solved in that the steering valve arrangement has a directional valve and a flow control valve.

This embodiment provides a simple manner of ensuring a substantially improved equality of the steering behaviour in both steering directions. In many cases, the result will even be exactly equal steering behaviours. The function of the amount setting will be taken over by the flow control valve. Independently of the direction, in which the vehicle is steered, the flow control valve supplies the amount of hydraulic fluid defined by the driver via the actuation of the steering unit. The directional valve only determines the direction, in which the vehicle shall be steered. The influence, which the directional valve takes on the flow amount of hydraulic fluid, can be heavily reduced or even eliminated.

Preferably, the directional valve is placed after the flow control valve in the direction from the supply connections to the steering motor connections. This gives a substantial simplification of the piping arrangement.

Preferably, a control inlet arrangement of the directional valve is connected to the steering unit and a control inlet of the flow control valve is connected to the directional valve. Thus, the flow control valve is controlled through the directional valve. This has the advantage that it can be ensured in a simple manner that an actuation of the steering unit will cause the directional valve to respond and be actuated first. The flow control valve is not actuated until the direction has been established. This permits a very simple design of the directional valve. It no longer has to be ensured that here throttling spots open gradually to permit a jerk-free steering. On the contrary, the directional valve can practically be an "on-off" valve. The flow control including a controlled opening of throttling spots can be taken over by the flow control valve.

Preferably, the flow control valve has a larger activation pressure than the directional valve. Also with this measure it is ensured that the directional valve is actuated earlier, that is, at a lower pressure, than the flow control valve. The directional valve is in any case open in one direction or the other, when the flow control valve starts leading hydraulic fluid to the working connections.

Preferably, the steering unit has a manually actuated control device, which has a pressure connection and two directional connections, the pressure connection being connected to a pressure source arrangement by means of a pipe path led through the flow control valve. The steering unit can, for example, be a unit of the type "OSP" from Sauer-Danfoss ApS, Nordborg, Denmark. Depending on the actuation of a steering handwheel, such a steering unit measures a certain amount of hydraulic fluid, which is supplied via the pressure connection and leads it on via one of the directional connections to the directional valve. Such a steering unit can also be used as emergency steering pump, when the hydraulic supply pressure fails, for example, when the drive motor of the vehicle fails, which motor also drives a hydraulic pump.

It is preferred that in the area of an end position of the flow control valve, which permits a maximum supply flow to the steering motor connections, the pipe path is throttled. This throttling can also be so extensive that the pipe path is closed. In this case, the driver receives a signal via the steering handwheel. In this case, the steering handwheel can namely only be turned with an increased torque. The driver then feels that the vehicle is more difficult to steer. Then the driver knows that the flow control valve is in the maximum opening position and that a higher steering speed is not longer possible.

Preferably, a change-over valve is located between the directional valve and the flow control valve, the outlet of the change-over valve being connected to a supply inlet of the directional valve, the supply inlet being connected to one of the two steering motor connections in dependence of an actuation device of the directional valve, a first inlet of the change-over valve being connected to a pressure outlet of the flow control valve and a second inlet of the change-over valve being connected to the steering unit via the directional valve. This embodiment is particularly advantageous, when the steering unit is used as an emergency steering pump during a failure of the hydraulic pump. The change-over valve then ensures that the hydraulic fluid from the emergency steering pump no longer has to be led via the flow control valve to the steering motor connections, but can be led to the steering motor connections directly via the change-over valve and through the directional valve.

It is also preferred that the directional valve and the flow control valve each have a slide. The use of slide valves in steering devices has proved to be good. An axial displacement of the slides permits a simple setting of the different positions of the valves.

Preferably, a supply connection connected to a tank has a pre-set non-return valve opening in the direction of the tank. Thus it is ensured that in the hydraulic system of the steering unit a predetermined minimum pressure is always maintained. This minimum pressure is determined by the presetting of the non-return valve. It can, for example, be in the range from 4 to 5 bar.

It is also advantageous, when the steering unit has an electrically actuated control valve. This control valve can be provided alternatively or additionally to the mechanically actuated steering unit. The control valve can, for example, be an electrically actuated proportional valve of the type PVE from Sauer-Danfoss ApS, Nordborg, Denmark.

It is preferred that the steering unit and the control valve are connected to the control inlet of the directional valve via a change-over valve arrangement. Thus, the directional valve always reacts to the higher of the two pressures from control valve and steering unit. When the outlet pressure of the control valve is limited, it can thus be ensured in a simple manner that the steering via a steering handwheel and the steering unit always has priority over the steering with the control valve.

It is also advantageous that the control valve is connected to the control inlet of the flow control valve, the flow control valve being connected to the control valve via a feed-back unit. Thus, the flow control valve is no longer controlled through the directional valve. However, via the feed-back unit, for example a position sensor, which reacts to the slide of the flow control valve, it can always be ensured that the flow control valve permits the flow of hydraulic fluid to the steering motor connections in the desired manner.

BRIEF DESCRIPTION OF THE DRAWINGS

In the following, the invention is described by means of preferred embodiments in connection with the drawings, showing.

DETAILED DESCRIPTION OF THE INVENTION

Figure 1:
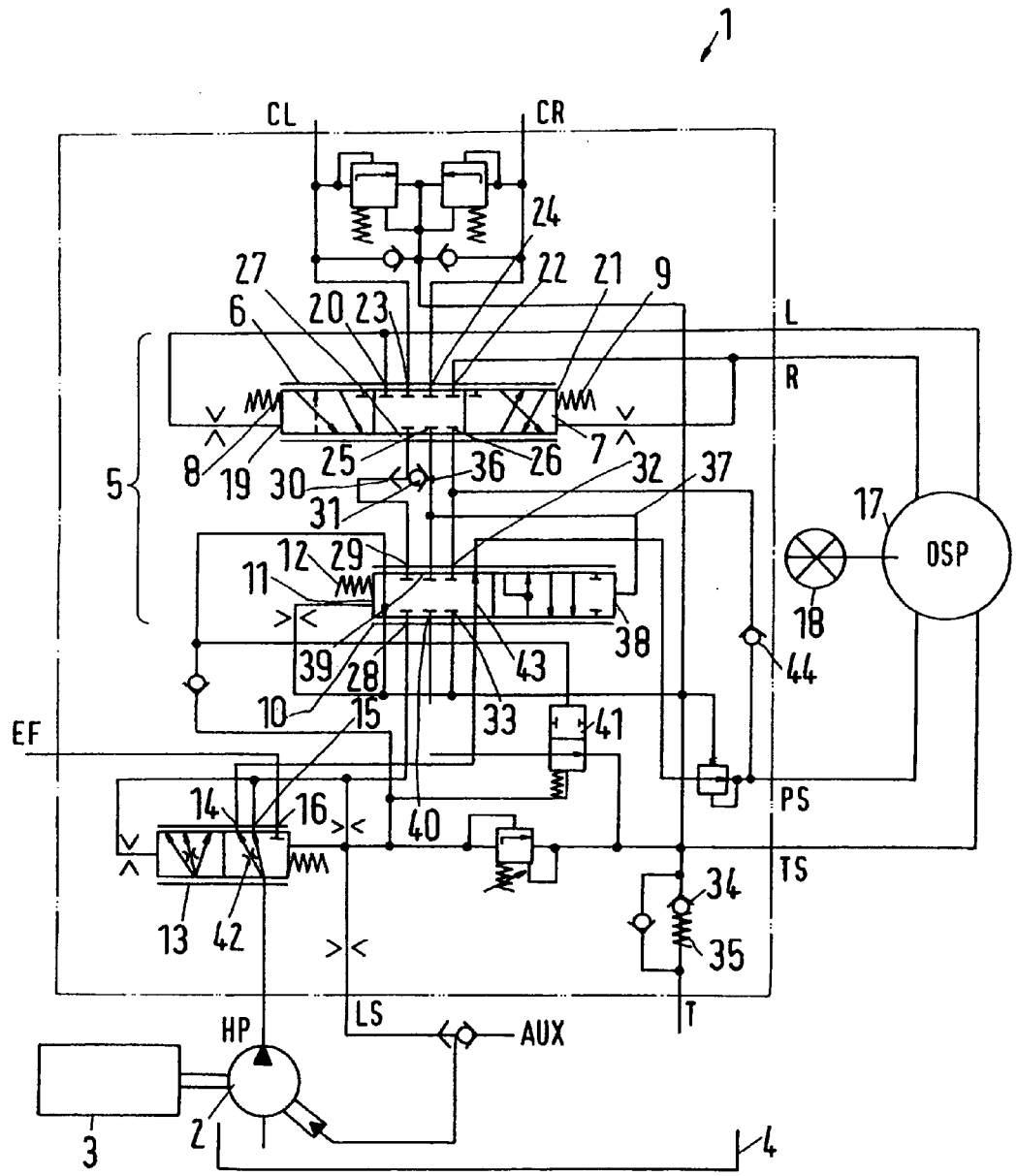
FIG. 1 is a first embodiment of a hydraulic steering arrangement.

FIG. 1 shows a hydraulic steering arrangement 1 with steering motor connections CL, CR and supply connections HP, T. Additionally a load-sensing connection LS is provided at the supply connections HP, T.

A steering motor can be connected to the steering motor connections CL, CR, said motor being used for steering a vehicle, not shown in detail. A pump 2 is connected to a high-pressure connection HP, the pump 2 being driven by a motor 3, for example the drive motor of the vehicle. The other supply connection T ends in a tank 4.

The steering arrangement 1 has a steering valve arrangement 5, which both determines a deflection direction and a deflection speed of the steered members of the vehicle.

The steering valve arrangement has a directional valve 6 with a directional valve slide 7. In a neutral position, the directional valve slide is loaded by two springs 8, 9. The springs 8, 9 define an actuation pressure, which is, for example, in the range from 3 to 5 bar.

The steering valve arrangement 5 further has a flow control valve 10 with a flow control valve slide 11, which can be moved against the force of a spring 12. The force of the spring 12 corresponds to a pressure of approximately 5 to 10 bar. At any rate, the force of the spring 12 is larger than the force of the springs 8, 9.

The supply connection HP is connected to a priority valve 13, which has three outlets 14, 15, 16, the outlet 16 being connected to an inlet EF, through which further hydraulic consumers can be supplied.

A hydraulic steering unit 17, for example a steering unit OSP of Sauer-Danfoss ApS, Nordborg, Denmark, can be actuated via a steering handwheel 18. The steering unit 17 has a connection PS, through which the steering unit 17 is supplied with pressurised hydraulic fluid, as will be explained overleaf.

Further, the steering unit has a connection TS, which is connected to the supply connection T, as will also be explained overleaf.

The steering unit 17 has a first directional connection L and a second directional connection R. The directional connection L is connected twice with the directional valve 6. Firstly, the directional connection L is connected to a control inlet 19, through which the pressure from the directional connection L acts upon the slide 7. Secondly, the directional connection L is connected to a first directional inlet 20 of the directional valve 6.

In a similar manner, a second directional inlet R of the steering unit 17 is connected to a control inlet 21, through which pressure acts upon the slide 7 of the directional valve 6, und with a second directional inlet 22.

The directional valve 6 has a first directional outlet 23, which is connected to the steering motor connection CL, and a second directional outlet 24, which is connected to the steering motor connection CR.

The directional valve 6 has a control outlet 25, a return flow outlet 26 and a supply inlet 27.

The flow control valve 10 has a pressure inlet 28, which is connected to the second outlet 15 of the priority valve. As soon as the slide 11 of the flow control valve 10 is actuated, the pressure inlet 28 is connected to a pressure outlet 29, which is connected to a first inlet 30 of a change-over valve 31, whose outlet is connected to the supply inlet 27 of the directional valve 6.

The return flow outlet 26 of the directional valve 6 is connected to a return flow inlet 32 of the flow control valve 10, which is connected to a return flow connection 33 of the flow control valve 10, as soon as the slide 11 of the flow control valve 10 is actuated. The return flow connection 33 is connected to the connection TS of the steering unit 17. This connection TS is connected to the supply connection T and thus with the tank 4 via a prestressed non-return valve 34. The non-return valve 34 has a prestressing spring 35, which, for example, ensures a minimum pressure at the connection TS of 4.5 bar.

The control outlet 25 of the directional valve is firstly connected to the second inlet 36 of the change-over valve 31. Secondly, it is connected to a control inlet 38 of the flow control valve 10 via a pipe 37. A pressure at the control inlet 38 acts against the force of the spring 12. Finally, the control inlet 25 is also connected to an inlet 39 of the flow control valve 10, which is, on actuation of the slide 11, connected to an outlet 40, which is connected to the connection TS via a stop valve 41, which can be closed by a pressure at the pressure outlet 29 of the flow control valve 10.

The first outlet 14 of the priority valve 13, which is throttled (see throttle 42) in the shown position of the priority valve 13, in which merely the steering arrangement 1 is supplied with hydraulic fluid, is connected to the outlet PS of the steering unit 17 via a pipe path 43, which is formed in the flow control valve 10. The pipe path 43 remains open over the largest share of the movement of the slide 11 of the flow control valve 10. Merely in the area of an end position, in which the flow control valve 10 permits passing of the maximum amount of hydraulic fluid, the pipe path 43 is interrupted, so that hydraulic fluid can no longer be supplied to the connection PS of the steering unit 17 via this pipe path 43.

In a manner known per se, the second outlet 15 of the priority valve is connected to the load sensing connection LS.

Further shown are some anti-cavitation valves, overpressure valves and pressure control valves, which will not be explained in detail, as they are known per se.

When, now, the steering handwheel 18 is turned, for example to turn the vehicle to the right, the steering motor connection CR must be supplied with pressurised hydraulic fluid. To manage this, the steering unit 17 provides a pressure on the control inlet 21 of the directional valve 6 via the directional outlet R, which displaces the slide 7 to the left (in relation to the view in FIG. 1). Thus, the pressure from the second directional inlet 22 reaches the control outlet 25. At the same time, the first directional outlet 23, which is connected to the steering motor connection CL, is connected to the return flow outlet 26, from which hydraulic fluid can flow off via the flow control valve 10, as soon as this valve has opened.

The pressure at the control outlet 25 is led to the control inlet 38 of the flow control valve 10, where it displaces the slide 11, also to the left. Thus, the pressure inlet 28 is connected to the pressure outlet 29, and the hydraulic fluid leaving here reaches the second directional outlet 24 via the change-over valve 31 and the supply inlet 27 of the directional valve 6, and from here to the steering motor connection CR. In this connection, the position of the slide 11 of the flow control valve 10 determines the amount of hydraulic fluid supplied to the steering motor connection CR.

As soon as the slide 11 of the flow control valve 10 has been displaced to an end area, in which the maximum flow of hydraulic fluid is released, the pipe path 43 is interrupted and via a non-return valve 44, the connection PS of the steering unit 17 receives merely the share of the hydraulic fluid returning from the steering motor connection CL. The result of this is that it gets harder to turn the steering handwheel 18 und this signals to the driver that the maximum steering speed has been reached.

If, on the other hand, the vehicle is steered in the opposite direction, the steering unit 17 supplies a pressure via the directional outlet L, which then acts upon the first control inlet 19 of the directional valve 6 and displaces the slide 7 to the right. Thus, the pressure from the first directional inlet 20 reaches the control outlet 25 of the directional valve and the flow control valve 1o is controlled in the same way as before, when steering to the right.

If the motor 3 should fail, accordingly not being able to supply the pump 2, the steering unit 17 can be used as emergency steering pump. In this case, the pressure supplied via the directional input 20, 22, which is also distributed via the control outlet 25, is passed on to the second inlet 36 of the change-over valve 31. As, at the first inlet 30 of the change-over valve 31 no pressure is available (the pump 2 does not work and the flow control valve 10 is closed), the pressure from the directional outlet L, R of the steering unit 17 is then led on to the corresponding directional outlet 23, 24 of the directional valve 6.

The stop valve 41 can be used to create a fixed stop for the movement of the steering handwheel 18, when the corresponding steering cylinder (or another working motor) is in the end position.

The spring preload of the stop valve 41 is smaller than the spring preload of the priority valve 13. This causes that during normal operation the stop valve 41 is open. When, however, the steering cylinder is in an end position, the pressure increases. A pilot valve in the LS-pipe opens for the load-sensing pressure to the tank. The non-return valve in the load-sensing pipe prevents a return flow and a pressure difference occurs over this non-return valve, which corresponds to the spring preload of the priority valve 13. As the stop valve 41 is controlled by the pressure difference over this non-return valve, and as, in the end position of the steering cylinder, this pressure difference exceeds the spring preload of the stop valve 41, the stop valve 41 goes to the closed position. As now the path of the pilot fluid to the tank 4 is blocked, the steering wheel torque at the steering unit 17 will increase and the driver will feel this as a fixed stop.

Figure 2:
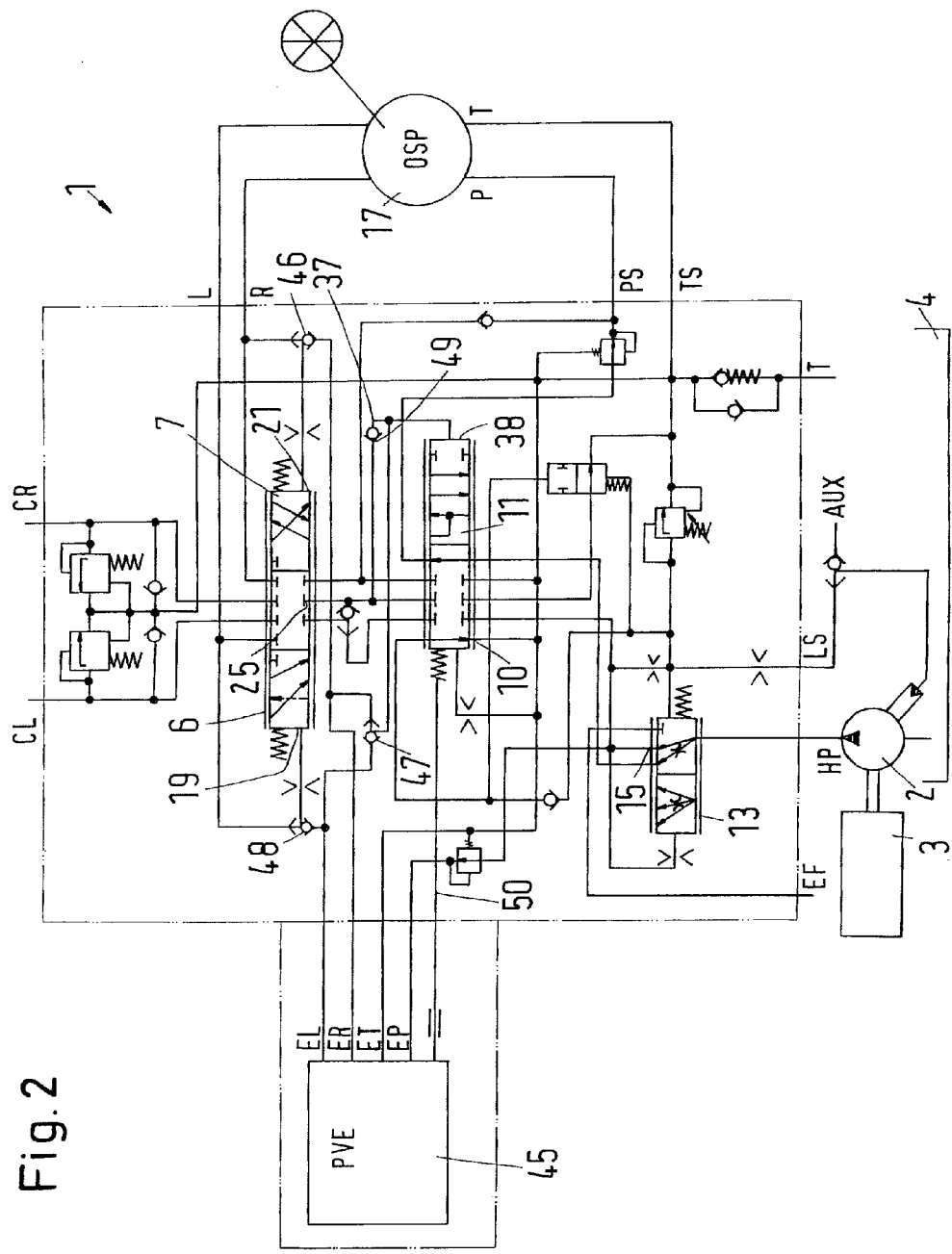
FIG. 2 is a second embodiment of a hydraulic steering arrangement.

FIG. 2 shows a modified embodiment of a steering arrangement 1, in which the same elements have the same reference numbers as in FIG. 1. As, to a large extent, the steering arrangement 1 according to FIG. 2 corresponds to the steering arrangement according to FIG. 1, merely the differences will be explained here.

Additionally to the steering unit 17, the steering arrangement 1 has an electrically actuated control valve 45, for example an electrically actuated proportional valve of the type PVE from Sauer-Danfoss ApS, Nordborg, Denmark.

The control valve PVE has a directional outlet ER for steering the vehicle to the right, a directional outlet EL for steering the vehicle to the left, a tank outlet ET and a pump inlet EP. The pump inlet EP is connected to the priority valve 13 by way of the second outlet 15. The tank outlet ET is connected to the point TS.

The directional outlet ER is connected to the control inlet 21 of the directional valve 6 via a change-over valve 46, thus controlling the slide 7 so that a path to the steering motor connection CR is released. Further, the directional connection ER is connected to the control inlet 38 of the flow control valve 10 via a change-over valve 47.

In a similar manner, the directional outlet EL of the control valve 45 is connected to the control inlet 19 of the directional valve 6 via a change-over valve 48. Further, the directional outlet EL is connected to the control inlet 38 of the flow control valve 10 via the change-over valve 47.

The mode of operation is like that of the steering arrangement according to FIG. 1. Depending on whether the steering unit 17 or the control valve 45 supplies the higher pressure, the directional valve 6 is actuated via the steering unit 17 or the control valve 45. When the steering unit 17 supplies a higher pressure than the control valve, also the flow control valve 10 is controlled by the steering unit 17. For this purpose, a non-return valve 49 is provided in the pipe between the control outlet 25 of the directional valve 6 and the control inlet 38, before a point, in which the outlet of the change-over vale 47 ends in this control pipe 37.

Via a position transducer 50, the slide 11 of the flow control valve 10 is connected to the control valve 45. Thus, at any time the control valve 45 is able to control a pressure at the directional outlets ER, EL in such a manner that the desired amount of hydraulic fluid flows to the selected steering motor connection CR, CL.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering arrangement with a hydraulically actuated steering valve arrangement, steering motor connections, which are connected to supply connections via the steering valve arrangement, and a steering unit, wherein the steering valve arrangement has a directional valve and a flow control valve, wherein a stop valve, which is activated by a pressure at a pressure outlet of the flow control valve, creates a fixed stop for the steering unit, when a steering motor connected to the steering motor connections (CR, CL) is in an end position.

2. The steering arrangement according to claim 1, wherein the directional valve is placed after the flow control valve in the direction from the supply connections (HP, T) to the steering motor connections (CR, CL).

3. The steering arrangement according to claim 1, wherein a control inlet arrangement of the directional valve is connected to the steering unit and a control inlet of the flow control valve is connected to the directional valve.

4. The steering arrangement according to claim 1, wherein the flow control valve has a larger activation pressure than the directional valve.

5. The steering arrangement according to claim 1, wherein the steering unit has a manually actuated control device, which has a pressure connection (PS) and two directional connections (L, R), the pressure connection (PS) being connected to a pressure source arrangement by means of a pipe path led through the flow control valve.

6. The steering arrangement according to claim 5, wherein in the area of the end position of the flow control valve, which permits a maximum supply flow to the steering motor connections (CL, CR), the pipe path is throttled.

7. The steering arrangement according to claim 1, wherein the directional valve and the flow control valve each have a slide.

8. The steering arrangement according to claim 1, wherein a supply connection (T) connected to a tank has a pre-set non-return valve opening in the direction of the tank.

9. The steering arrangement according to claim 1, wherein the steering unit has an electrically actuated control valve.

10. The steering arrangement according to claim 9, wherein the control valve is connected to the control inlet of the flow control valve, the flow control valve being connected to the control valve via a feed-back unit.

11. A hydraulic steering arrangement with a hydraulically actuated steering valve arrangement, steering motor connections, which are connected to supply connections via the steering valve arrangement, and a steering unit, wherein the steering valve arrangement has a directional valve and a flow control valve, wherein a stop valve, which is activated by a pressure at a pressure outlet of the flow control valve, creates a fixed stop for the steering unit, when a steering motor connected to the steering motor connections (CR, CL) is in an end position, wherein a change-over valve is located between the directional valve and the flow control valve, the outlet of the change-over valve being connected to a supply inlet of the directional valve, the supply inlet being connected to one of the two steering motor connections (CL, CR) in dependence of an actuation direction of the directional valve, a first inlet of the change-over valve being connected to a pressure outlet of the flow control valve and a second inlet of the change-over valve being connected to the steering unit via the directional valve.

12. A hydraulic steering arrangement with a hydraulically actuated steering valve arrangement, steering motor connections, which are connected to supply connections via the steering valve arrangement, and a steering unit, wherein the steering valve arrangement has a directional valve and a flow control valve, wherein a stop valve, which is activated by a pressure at a pressure outlet of the flow control valve, creates a fixed stop for the steering unit, when a steering motor connected to the steering motor connections (CR, CL) is in an end position, wherein the steering unit has an electrically actuated control valve, wherein the steering unit and the control valve are connected to the control inlet arrangement of the directional valve via a change-over valve arrangement.

* * * * *